United States Patent
Sasaki et al.

(10) Patent No.: US 6,771,904 B1
(45) Date of Patent: Aug. 3, 2004

(54) OPTICAL TRANSMISSION SYSTEM AND OPTICAL CHANNEL AVAILABLE QUALITY MEASURING METHOD

(75) Inventors: Akira Sasaki, Chiba (JP); Shigeru Shikii, Aichi (JP); Hirokazu Ishimatsu, Tokyo (JP); Naomi Oohashi, Kanagawa (JP); Katsuhiro Ishimura, Chiba (JP)

(73) Assignee: Oki Electric Industry Co., Ltd., Tokyo (JP)

(*) Notice: Subject to any disclaimer, the term of this patent is extended or adjusted under 35 U.S.C. 154(b) by 512 days.

(21) Appl. No.: 09/705,778

(22) Filed: Nov. 6, 2000

(30) Foreign Application Priority Data

Mar. 2, 2000 (JP) .................................. 2000/057089

(51) Int. Cl.[7] .................. H04B 10/08; H04B 17/00
(52) U.S. Cl. .................. 398/25; 398/16; 398/5
(58) Field of Search .................. 398/34, 17, 25, 398/16, 30, 32, 5

(56) References Cited

U.S. PATENT DOCUMENTS

| | | | | |
|---|---|---|---|---|
| 5,247,380 A | * | 9/1993 | Lee et al. | 398/118 |
| 5,299,044 A | * | 3/1994 | Mosch et al. | 398/35 |
| 5,790,287 A | * | 8/1998 | Darcie et al. | 398/108 |
| 6,384,948 B1 | * | 5/2002 | Williams et al. | 398/202 |
| 6,421,332 B1 | * | 7/2002 | Son | 370/335 |
| 6,594,048 B1 | * | 7/2003 | Song et al. | 398/79 |

OTHER PUBLICATIONS

Draft Recommendation G.872 (EX.G.OTN) "Architecture of Optical Transport Networks", Jun. 12, 1998, pp. 1–32.

* cited by examiner

Primary Examiner—Jason Chan
Assistant Examiner—Shi K. Li
(74) Attorney, Agent, or Firm—Venable LLP; Michael A. Sartori

(57) ABSTRACT

An optical transmission system according to the present invention includes a connection confirming circuit 106 for confirming connection of an input data signal, a test signal generator 105 for generating a test signal, and a switching device 107 on a transmitter side. The switching device 107 selectively generates the input data signal from an output terminal in the case where the input data signal is detected by the connection confirming circuit 106, and the test signal when the input data signal is not detected. An output of the switching device 107 is connected to an optical transmitter TX. On a receiver side, there is provided a determination circuit for receiving an optical signal from a transmission path and detecting the test signal to determine transmission characteristics of the transmission path on the basis of the test signal.

11 Claims, 10 Drawing Sheets

AVAILABLE QUALITY MATRIX (CITED FROM ITU RECOMMENDATION I.357)

OPTICAL TRANSMISSION SYSTEM AND OPTICAL CHANNEL AVAILABLE QUALITY MEASURING METHOD

BACKGROUND OF THE INVENTION (i) Field of the Invention

The present invention relates to an optical communication system using an optical fiber.

(ii) Description of the Related Art

In a conventional optical transmission system, for example, in the case of a single wavelength transmission, a signal of one optical channel using one wavelength is optically modulated and transmitted to one optical fiber. In this case, when the optical fiber is used for a service, whether the optical channel is available can be confirmed by detecting a deterioration in optical signal which is actually transmitted or an input disconnection of the signal. When the optical fiber is not used for the service (it is not under operation), the optical signal of the wavelength which is used for the service is experimentally transmitted and the connection is confirmed, so that the availability of the optical channel can be confirmed.

In the case of a wavelength division multiplexing (WDM) transmission in which different wavelengths are allocated to a plurality of optical channels and those are multiplexed to be transmitted, when the optical channels are used for the service, the availability of each of the optical channels (wavelengths) can be recognized by detecting the deterioration in optical signal of the wavelength in question which is actually transmitted or input disconnection of such a signal. For the wavelength not under operation, which is not used for the service, whether it is available or unavailable is estimated by detecting the availability of the wavelength under operation for the service. In the case of before the start of the service operation, for instance, just after laying the optical fiber, one proxy wavelength among a plurality of wavelengths is selected and the connection of the wavelength is confirmed, so that it is determined that all of the wavelengths are available.

As mentioned above, in the case of the single-wavelength transmission, when the line not under operation is switched so as to be used for the service, to assure a communication quality, the operator of a communication system (generally, the maintenance person for communication carriers) must previously perform a connection test to confirm the availability and, after that, switch the corresponding optical fiber to be in the service operation state. It is cumbersome for the maintenance person.

Also in the case of the WDM transmission, on the basis of a specific wavelength under operation for the service, the availability of the optical channel not under operation is estimated. It does not mean that the actual availability of each of the wavelengths which can be used for the service is confirmed.

On the other hand, in ITU-T (International Telecommunication Union), the available quality of the transmission is defined as shown in FIG. 3. FIG. 3 illustrates the available quality matrix according to ITU Recommendation I357. When it is applied to the wavelength division multiplexing transmission, in the case where the wavelength of a specific optical channel is in the non-operating state (hereinbelow, referred to as an optical channel not under operation), there is no means of determining whether the optical channel not under operation is available, namely, it denotes a state (3) in FIG. 3 during the system operation. Therefore, when it is desired to operate the optical channel not under operation because of any reason, in order to determine whether the channel is surely in the available state and then use it, it is necessary that the system operation is temporarily stopped, the optical channel is checked, after that, the optical channels are switched, and a procedure for the start of the operation is again performed.

SUMMARY OF THE INVENTION

The present invention solves the above-described problems. According to the invention, there are provided a method and an apparatus whereby even when a specific optical channel is not under operation, the availability of the optical channel can be voluntarily measured.

To solve the above problems, an optical transmission system of the present invention has on a transmitter side a connection confirming circuit for confirming connection of an input data signal, a test signal generator for generating a test signal, and a switching device. The switching device has an input terminal to which the input data signal is supplied, an input terminal to which the test signal is supplied, and an output terminal and selectively generates the input data signal from the output terminal when the input data signal is detected by the connection confirming circuit, and the test signal when the input data signal is not detected. An optical transmitter for converting the signal outputted from the switching device into an optical signal of a predetermined wavelength and generating it to a transmission path is provided for the output terminal of the switching device. On a receiver side, there are provided a test signal detection circuit for receiving the optical signal from the transmission path to detect the test signal and a determination circuit for determining transmission characteristics of the transmission path on the basis of the test signal detected by the test signal detection circuit.

DETAILED DESCRIPTION OF THE PREFERRED EMBODIMENTS

First Embodiment

Figure 1:
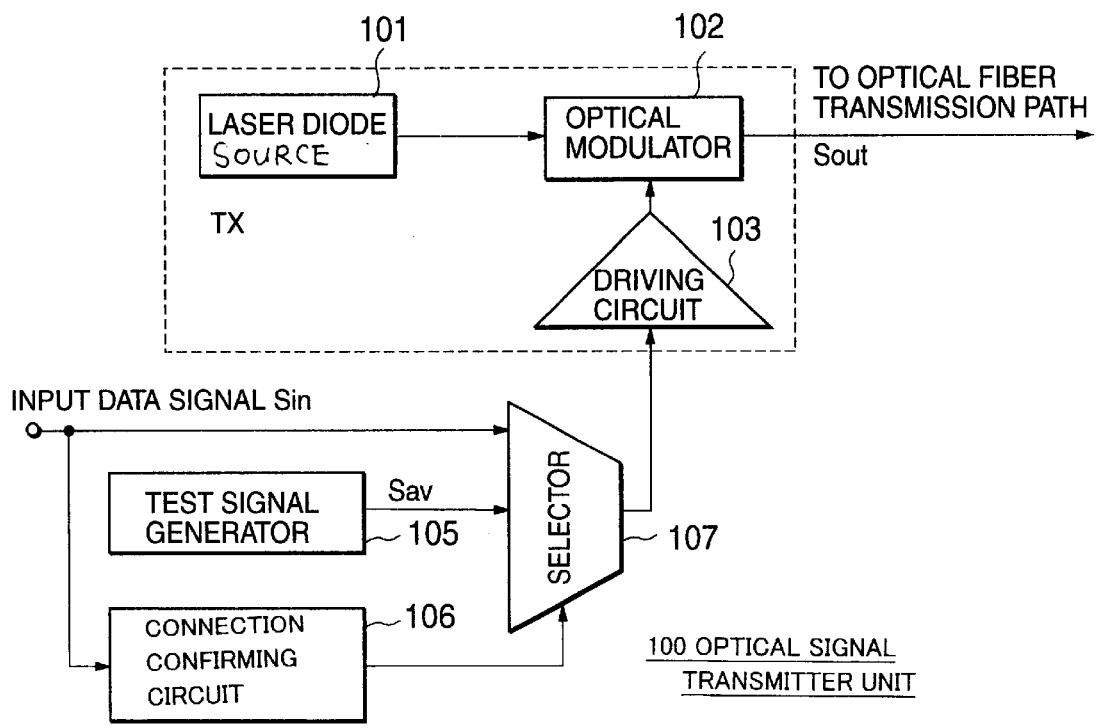
FIG. 1 is a block diagram showing a circuit construction of an optical signal transmitter unit 100 of a first embodiment.
Figure 2:
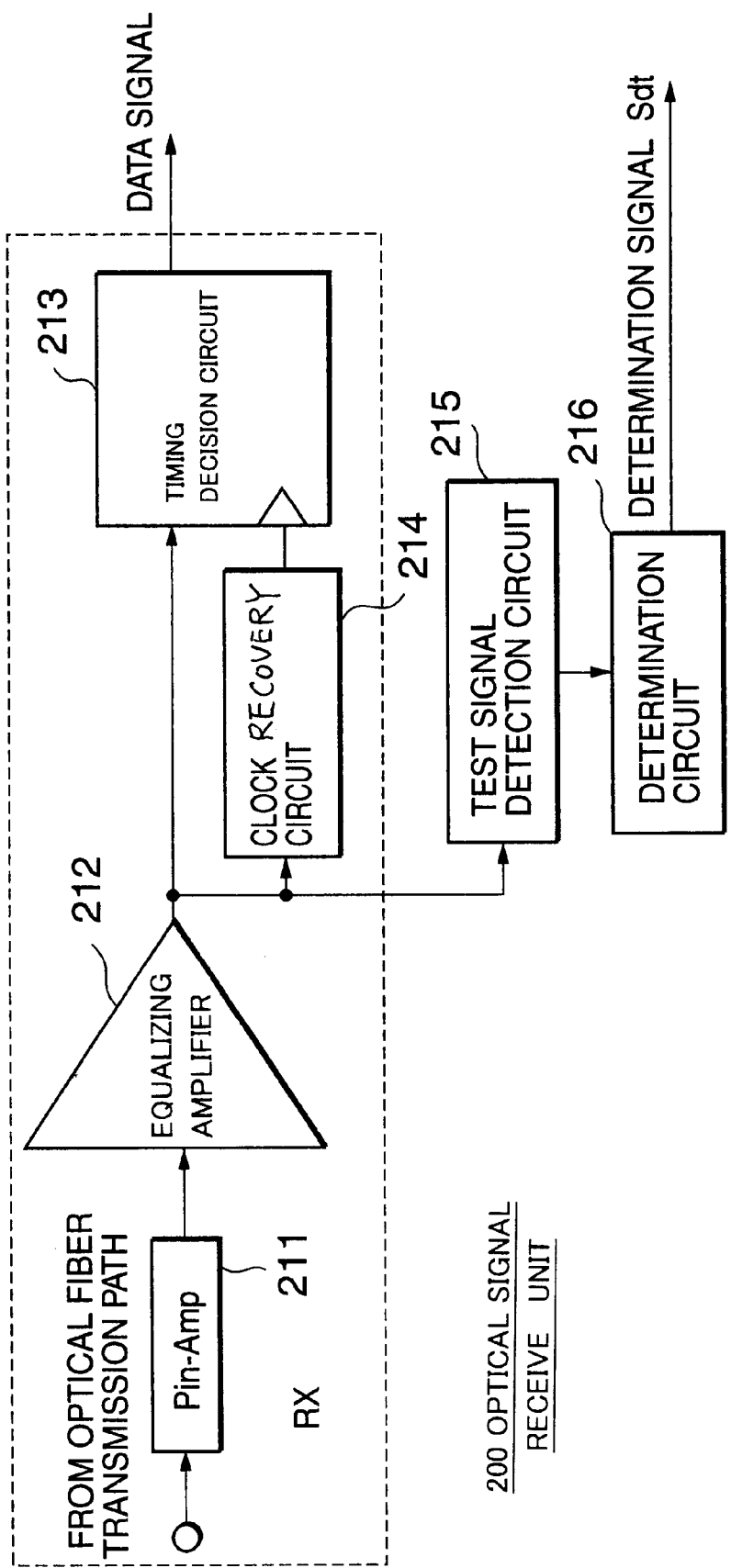
FIG. 2 is a block diagram showing a circuit construction of an optical signal receiver unit 200 of the first embodiment.
Figure 3:
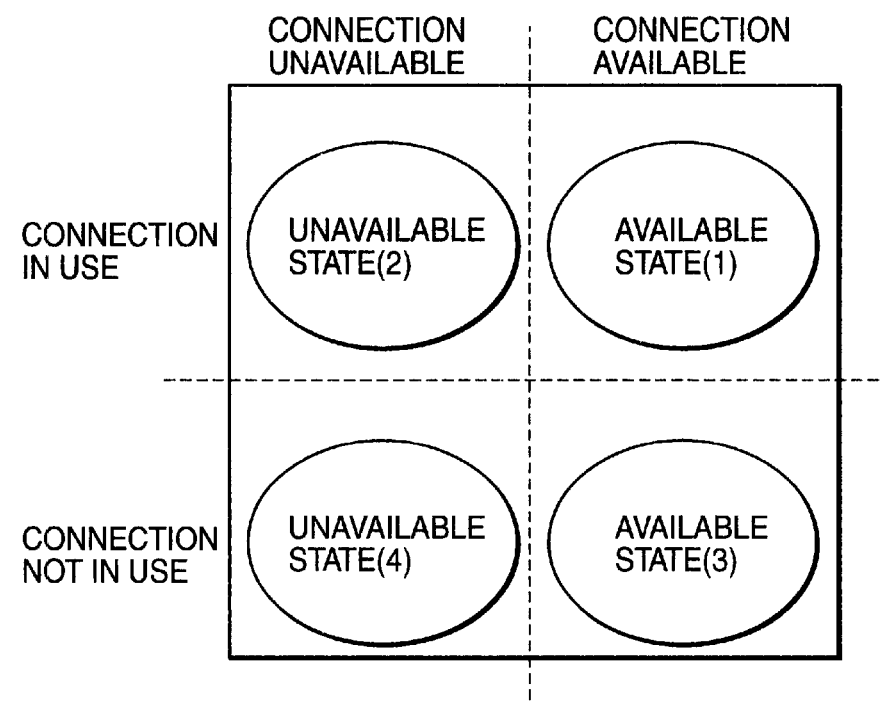
FIG. 3 is a diagram for explaining the available quality matrix according to ITU Recommendation I357.

A construction of a first embodiment of the present invention will now be described with reference to FIGS. 1 and 2. FIG. 1 is a block diagram showing a circuit construction of an optical signal transmitter unit 100 of the present embodiment. FIG. 2 is a block diagram showing a circuit construction of an optical signal receiver unit 200.

In the optical signal transmitter unit 100, an optical signal generated from a laser diode source 101 is supplied to an optical modulator 102 comprising an external modulator such as an EA (Electro-Absorption type) modulator or an LN (LiNbO$_3$: lithium niobate) modulator. The optical modulator 102 modulates the optical signal in accordance with a modulation signal from a driving circuit 103 and then transmits it as an output optical signal S$_{out}$ to an optical fiber transmission path.

The modulation signal is decided by the following procedure. First, when the optical signal transmitter unit is in a normal operating state, an input data signal S$_{in}$ is inputted. The presence or absence of the input data signal S$_{in}$ is determined by a connection confirming circuit 106. That is, when the input data signal S$_{in}$ is present, the connection confirming circuit 106 outputs "1" and, when the input data signal Sin is absent, it generates "0".

The output of the connection confirming circuit 106 is transmitted to a control unit (not shown) and is used to control a selector 107 via the control unit.

The selector 107 has a construction to selectively supply the input data signal S$_{in}$ and a test signal S$_{av}$ to the driving circuit 103. In the case of "1", the control unit controls the selector 107 so that the input data signal S$_{in}$ is supplied to the driving circuit 103. On the contrary, in the case of "0", the control unit switches the selector 107 so that the test signal S$_{av}$ formed by a test signal generator 105 is supplied to the driving circuit 103.

The test signal S$_{av}$ is a signal for evaluating the availability of the optical fiber transmission path. A repeat signal having an operating speed that is lower than that of the input data signal S$_{in}$ is used as a test signal.

Consequently, when the input data signal S$_{in}$ is not supplied, the test signal S$_{av}$ is supplied to the driving circuit 103. On the basis of the test signal S$_{av}$, a driving signal for the optical modulator 102 is formed.

The optical signal from the laser diode source 102 is modulated through the driving signal in the optical modulator 102. The modulated optical signal is supplied to the optical fiber transmission path serving as a test object.

The test signal supplied to the optical fiber transmission path passes through such a transmission path to be tested and then inputted to an optical signal receiver unit 200 shown in FIG. 2.

In the optical signal receiver unit 200, the received optical signal is converted into an electric signal by a PIN amplifier (PIN-Amp) 211. After that, an equalizing amplifier 212 compensates for waveform transmission characteristics and the like of the optical fiber transmission path. An output of the equalizing amplifier 212 is supplied to a timing decision circuit 213. Simultaneously, a part of the output of the equalizing amplifier 212 is supplied to a clock recovery circuit 214 to generate various timing signals of the optical signal receiver unit 200 synchronized with the transmitter.

The signal inputted to the timing decision circuit 213 is subjected to stamping, timing correction, and waveform shaping by the timing signal formed by the clock recovery circuit 214 and thus processed signal is generated as a data signal.

Further, a part of the output of the equalizing amplifier 212 is also supplied to a test signal detection circuit 215 to detect the presence or absence of the test signal inserted on the transmitter side in the received signal. In the test signal detection circuit 215, when the presence of the test signal is detected, the test signal is supplied to a determination circuit 216. On the basis of specially specified criterion to determine, for example, whether a condition of an S/N ratio of 20 dB or more corresponding to a BER (bit error rate) of 10$^-$11 or less is satisfied, whether the optical fiber transmission path as a test object is available or unavailable is determined.

The determination result is outputted as a determination signal S$_{dt}$. The control unit (not shown) uses the signal as a switching control signal in use of the optical channel.

As mentioned above, according to the present embodiment, the test signal generator 105 is provided for the optical signal transmitter unit 100 and the test signal detection circuit 215 is provided for the optical signal receiver unit 200. Thus, the input data signal or test signal is always supplied selectively to the optical fiber transmission path, so that the available state of the optical transmission system can be detected.

In the present embodiment, an optical transmitter TX is constructed by individual constitutional components such as laser diode source 101 and optical modulator 102 surrounded by a broken line. The present invention can be also applied to a construction of the optical transmitter TX in which signal light generated from the laser diode source 101 is directly modulated.

Further, in the present embodiment, the low-speed continuous repeat signal is used as a test signal. A construction in which an intermittent repeat signal is transmitted every predetermined period or a construction in which control information is superimposed to a signal and the resultant signal is then transmitted can be also used.

Alternatively, the invention can be also applied to a construction in which a continuous wave(CW) optical signal such as a normal wave or a pulse signal with a predetermined power and a predetermined frequency is continuously transmitted or intermittently transmitted every predetermined period and light emission wavelength spectra and power are observed on the receiver side to determined transmission characteristics.

In the present embodiment, the description only for the optical signal transmitter unit 100 provided on the transmitter side and the optical signal receiver unit 200 provided on the receiver side has been made. The transmitter is generally arranged so as to be physically away from the receiver and a repeater station or the like is disposed between them. This invention can be also applied to such a construction.

Further, in the case of the construction according to the present embodiment, when the system is normally operated, either the input signal or test signal is supplied to the optical signal receiver unit. Consequently, when neither the input signal nor test signal is detected in the optical signal receiver unit for a predetermined period, it is possible to determine such a state that some failure occurs on the transmission path.

Second Embodiment

In the first embodiment, the case of the single wavelength transmission using one laser diode source on the optical signal transmitter unit side has been described. This invention can be also applied to the WDM transmission system in which different wavelengths are allocated to a plurality of optical channels and they are multiplexed and then transmitted.

The optical signal transmitter unit for each optical channel on the transmitter side requires the laser diode source 101, optical modulator 102, driving circuit 103, test signal generator 105, connection confirming circuit 106, and selector 107, shown in FIG. 1.

The outputs modulated by the respective optical modulators are multiplexed by a multiplexer to generate a WDM signal. The obtained signal is transmitted to the optical fiber transmission path.

On the receiver side, the WDM signal transmitted from the optical fiber transmission path is branched into optical channels by the de-multiplexing filter and then transmitted to the corresponding optical signal receiver units. In other words, in a manner similar to the optical signal transmitter units on the transmitter side, the PIN-Amp 211, an optical receiver, the equalizing amplifier 212, timing decision circuit 213, clock recovery circuit 214, test signal detection circuit 215, and determination circuit 216 shown in FIG. 2 are needed for each optical channel.

Figure 4:
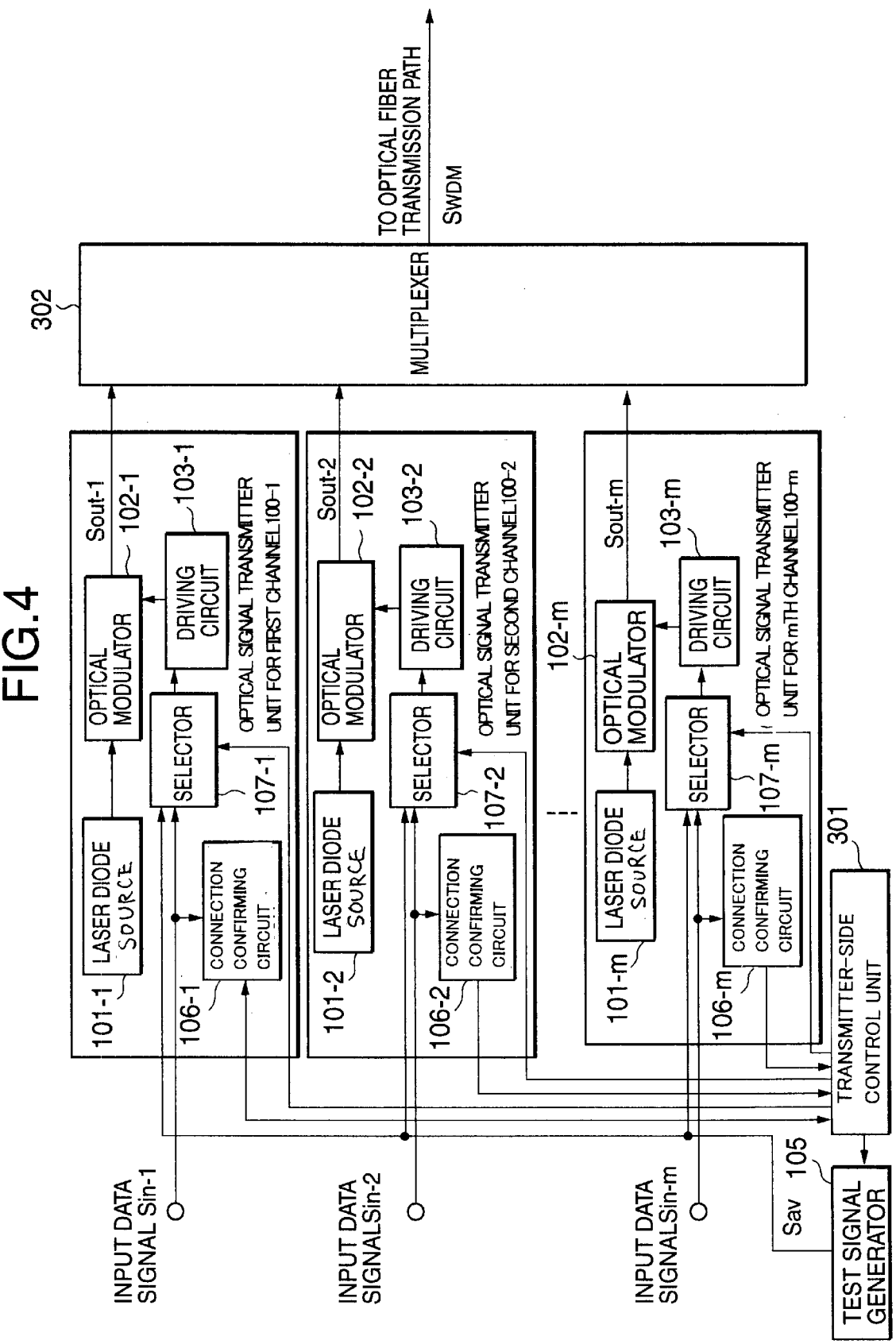
FIG. 4 is a block diagram showing a construction on a transmitter side of a second embodiment.
Figure 5:
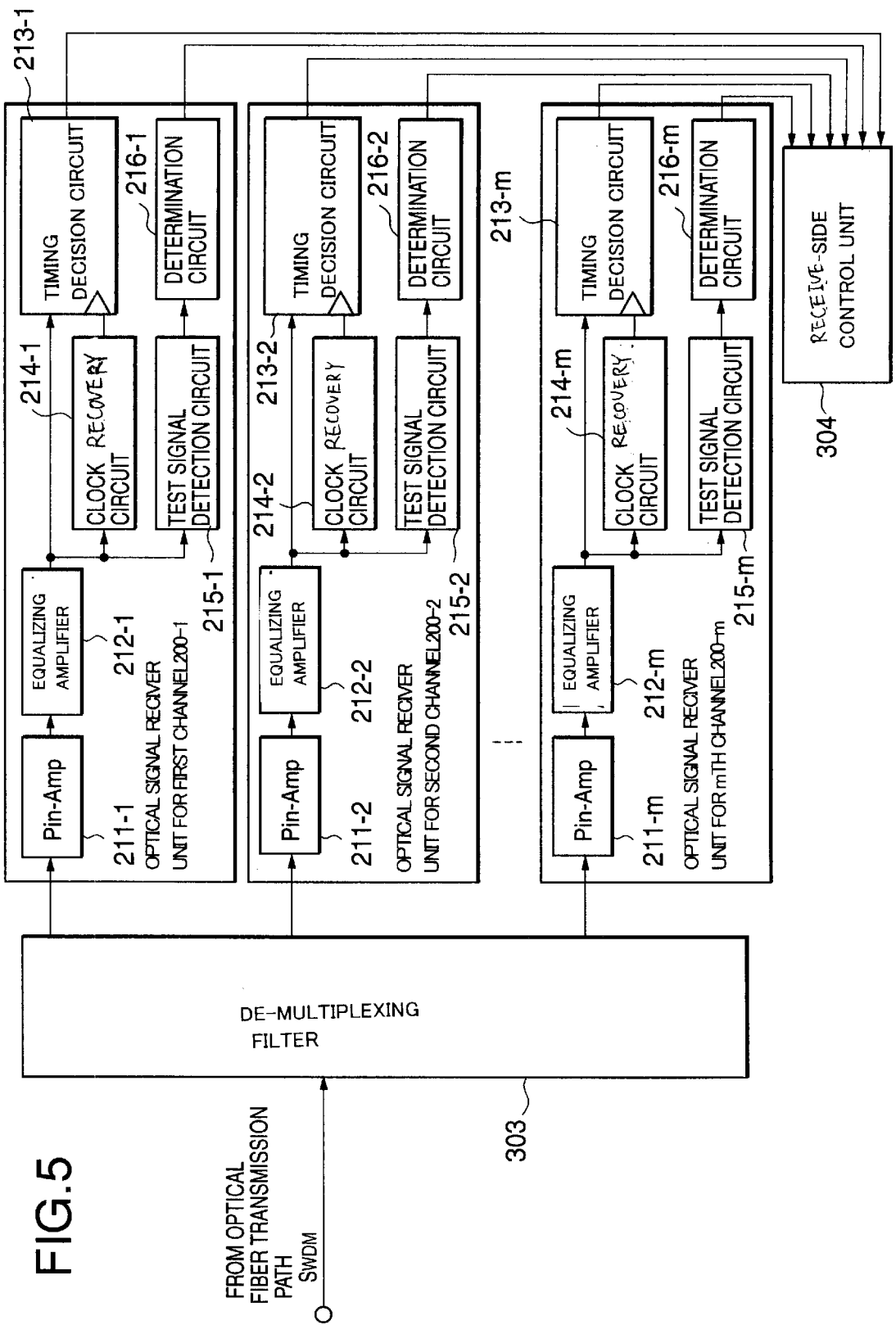
FIG. 5 is a block diagram showing a construction on a receiver side of the second embodiment.

FIGS. 4 and 5 show the details of the above-mentioned construction in which the present invention is applied to the WDM transmission system. FIG. 4 is a block diagram showing the construction on the transmitter side and FIG. 5 is a block diagram showing the construction on the receiver side.

The WDM transmission system shown in FIGS. 4 and 5 has m (m is an integer of 2 or more) optical channels. Optical signal transmitter units 100-1, 100-2, . . . , and 100-m corresponding to the first optical channel, second optical channel, . . . , and mth optical channel are provided on the transmitter side. These optical signal transmitter units 100-1., 100-2, . . . , and 100-m have substantially the same construction as that of the optical signal transmitter unit 100 shown in FIG. 1 other than such a point that the laser diode sources of the respective optical channels have different oscillation wavelengths as mentioned above. The test signal generator 105 for supplying the test signal to the optical signal transmitter units 100-1, 100-2, . . . , and 100-m is shared among all of the units.

In the normal operating state, input data signals $S_{in-1}$, $S_{in-2}$, . . . , and $S_{in-m}$ are supplied to the optical signal transmitter units 100-1, 100-2, . . . , and 100-m for the respective optical channels. The operation itself of each of the optical signal transmitter units 100-1, 100-2, . . . , and 100-m is the same as that of the optical signal transmitter unit 100 shown in FIG. 1. In accordance with control by a transmitter-side control unit 301, output signals $S_{out-1}$, $S_{out-2}$, . . . , and $S_{out-m}$ having either one of the input data signal and test signal are transmitted from the respective optical channels.

The output signals $S_{out-1}$, $S_{out-2}$, . . . , and $S_{out-m}$ are wavelength-multiplexed by a multiplexer 302. The multiplexed signal is transmitted as a WDM signal $S_{WDM}$ to the optical fiber transmission path as a transmission path to be tested.

On the receiver side, the WDM signal $S_{WDM}$ passed through the optical fiber transmission path is first branched into the wavelength for the first optical channel, one for the second optical channel, . . . , and one for the mth optical channel by a de-multiplexing filter 303. The respective wavelengths are supplied to optical signal receiver units 200-1, 200-2, . . . , and 200-m corresponding to the respective channels. As mentioned above, each of the optical signal receiver units 200-1, 200-2, . . . , and 200-m has substantially the same construction as that of the optical signal receiver unit 200 shown in FIG. 2. The determination result regarding the availability of each optical channel is transmitted to a receiver-side control unit 304. Since the operation itself of each receiver unit is the same as that of the optical signal receiver unit 200 shown in FIG. 2, the detailed description is omitted.

In the present embodiment, the optical signal receiver units 200-1, 200-2, . . . , and 200-m have clock recovery circuits 214-1, 214-2, . . . , and 214-m, respectively, and the respective optical channels use different clocks. When the system on the receiver side is operated by a common clock, one clock recovery circuit can be shared in the whole system on the receiver side in a manner similar to the test signal generator 105 on the transmitter side.

The WDM transmission system shown in the embodiment has the construction in which the availability of each optical channel is confirmed by transmitting the test signal to each optical channel for an idle time during which there is no main signal to be originally transmitted. Consequently, the availability of each optical channel can be confirmed irrespective of the operating state and the non-operating state of the system.

The optical fiber transmission path is used as a transmission path to be tested in the present embodiment. In the case of such a construction in which the transmitter and receiver sides use the optical signals, any intermediate transmission path to be tested can be used.

Third Embodiment

According to the construction of the second embodiment, the availability of each optical channel in the WDM transmission system can be surely determined. A construction in which the transmission quality of the WDM transmission system is further raised can be also realized by using the above-mentioned construction can be also realized.

Problems regarding the transmission quality of the WDM transmission system utilizing the optical fiber have been described in, for example, "B-1104 (1996) by Kikuchi et al., Society Meeting of The Institute of Electronics, Information and Communication Engineers, 1996" and "B-1106 (1996) by Sekine et al., Society Meeting of The Institute of Electronics, Information and Communication Engineers, 1996". Those related technical documents disclose such a fact that in the WDM transmission system, when there are a plurality of signal wavelengths to be transmitted and a wavelength dispersion on an optical fiber transmission path in a signal wavelength band is small, a non-linear fiber effect such as FWM (Four Wave Mixing) or XPM (Cross Phase Modulation) occurs. Particularly, if signal wavelengths are located within a zero dispersion wavelength range the optical fiber transmission path, the non-linear fiber effect such as FWM or XPM remarkably occurs. New light generated due to the FWM becomes light interfering with the signal light. A distortion in the waveform due to the XPM causes inter-symbol interference. Accordingly, the occurrences of them cause deterioration in transmission quality.

To avoid the FWM or XPM influence, it is necessary that the wavelength dispersion of the optical fiber transmission path is large within the signal wavelength band. Most of the optical fiber transmission paths used in the WDM transmission system have already been laid in many cases. However, characteristics of the wavelength dispersion are not clear. In addition, the wavelength dispersion of the optical fiber transmission path is fluctuated in association with the aging effect (environmental condition fluctuation such as temperature, mechanical pressure).

Therefore, it is difficult to determine the signal wavelength band for the system. In addition, even if the optimum signal wavelength band can be determined at initial setting, there is such a probability that the determined signal wavelength band is not the optimum signal wavelength band due to the change with the aging effect after the initial setting.

To avoid the above problems, hitherto, the number of optical channels to be transmitted through the optical fiber transmission path are redacted. In the case of such a construction, the total number of WDM wavelengths per a single fiber is decreased.

According to a third embodiment, there is provided a WDM transmission system in which the transmission rate of an optical fiber transmission path can be extremely improved without sacrificing the number of optical channels (multiplicity).

Figure 6:
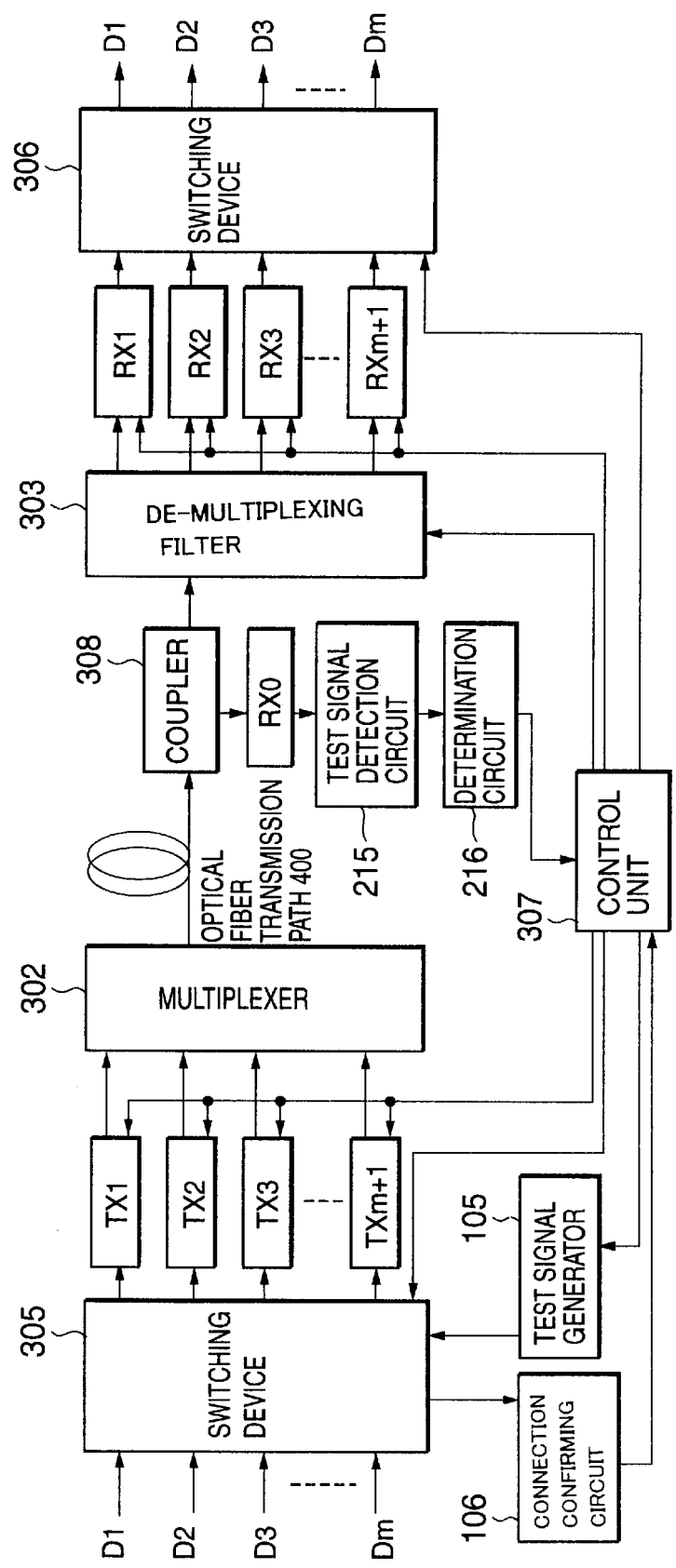
FIG. 6 is a block diagram showing a construction of a third embodiment.

FIG. 6 shows a constructional diagram of the third embodiment. The third embodiment has a construction in which m input data signals D1, D2, D3, . . . , and Dm are converted into optical signals having different wavelengths, those converted signals are wavelength-multiplexed, and the multiplexed signal is transmitted. The input data signals D1, D2, D3, . . . , and Dm include not only data of audio sounds and video images but also transmission quality monitoring information such as an bit error rate. The plurality of input data signals D1, D2, D3, . . . , and Dm and a test signal Dx generated by the test signal generator 105 are inputted to a switching device 305. On the output side, n (n is larger than m) optical transmitters are coupled to the switching device 305. In the present embodiment, (m+1) optical transmitters TX1, TX2, TX3, . . . , and TX(m+1), whose number is larger than that of the m input data D1, D2, D3, . . . , and Dm serving as objects in the actual data transmission by one, are coupled as n optical transmitters.

A specific construction of the switching device 305 will be described in detail later. The connecting relation of input/output terminals can be arbitrarily changed by controlling through a control unit 307. The input data signals D1, D2, D3, . . . , and Dm and the test signal Dx can be supplied to the arbitrary optical transmitters TX1, TX2, TX3, . . . , and TX(m+1).

Those optical transmitters TX1, TX2, TX3, . . . , and TX(m+1) have substantially the same as the TX portion surrounded by the broken line in the optical signal transmitter unit 100 shown in FIG. 1 other than such a point that they have different oscillation wavelengths. The detailed description regarding the construction and operation is omitted. Respective oscillation wavelengths are selected on the basis of instructions from the control unit 307.

Output signals from the optical transmitters TX1, TX2, TX3, . . . , and TX(m+1) are wavelength-multiplexed by the multiplexer 302. Thus processed signal is transmitted as a WDM signal to an optical fiber transmission path 400 as a transmission path to be tested.

On the receiver side, the WDM signal passed through the optical fiber transmission path is first branched into wavelengths of the respective optical channels by the de-multiplexing filter 303. The respective branched signals are supplied to optical receivers RX1, RX2, . . . , and RX(m+1) corresponding to the channels. Each of the (m+1) optical receivers RX1, RX2, . . . , and RX(m+1) has substantially the same as the RX portion surrounded by a broken line in the optical signal receiver unit 200 shown in FIG. 2. Thus, the detailed description with respect to the construction and the operation is omitted.

A part of the transmitted WDM signal is branched by a coupler 308 and then supplied to an optical receiver RX0. The signal is also supplied to the de-multiplexing filter 303. The de-multiplexing filter 303 filters the signal back into signals having the respective wavelengths. After that, the signals are supplied to the corresponding optical receivers RX0, RX1, RX2, . . . , and RX(m+1) to be reconstructed as data signals.

On the other hand, the optical signal branched by the coupler 308 is converted into an electric signal by the receiver RX0. The test signal detection circuit 215 detects the test signal Dx. The detection result is supplied to the determination circuit 216. In the determination circuit 216, transmission characteristics are measured on the basis of the detected bit error rate and the signal-to-noise ratio and whether the measurement result satisfies the transmission quality standard is determined according to a setting threshold. The determination result is transmitted to the control unit 307.

The measurement of the optical channel available quality and the determination of the optical channel in the above construction are performed in accordance with the following procedure.

The optical transmission system executes the test operation before the start of the actual operation. First, the connection confirming circuit 106 connected to the switching device 305 confirms that the input data signals D1, D2, D3, . . . , and Dm are not supplied. After that, the test signal Dx formed by the test signal generator 105 is sequentially supplied to the optical transmitters TX1, TX2, TX3, . . . , and TX(m+1) via the switching device 305 and then sequentially transmitted as an optical signal to the optical fiber transmission path 400. The transmitted optical signal is sequentially converted into the electric signal in the receiver RX0 via the coupler 308. After that, the signal passes through the test signal detection circuit 215 and the determination circuit 216, so that the transmission characteristics of the respective optical channels are sequentially measured and transmitted to the control unit 307.

The control unit 307 records the measured transmission characteristics of the optical channels and determines whether each optical channel satisfies a setting value. On the basis of the determination result, the control unit 307 selects the m optical transmitters and optical channels to be used for the optical transmission on the transmitter side. The control unit switches the connection in the switching device 305 so that the input data signals D1, D2, D3, . . . , and Dm are supplied to the selected optical transmitters. Similarly, on the receiver side, the control unit switches the connection in the switching device 306 so that the outputs from the optical receivers corresponding to the selected optical channels serve as output data.

Due to the test operation as mentioned above, the measurement of the optical channel available quality and the setting of the optical channels are finished. After that, the input data signals are supplied to the optical transmission system, so that the actual operation is started.

The test operation can be executed when a new transmission path is added to the operation (in use) paths to start the transmission, when they are periodically inspected in accordance with a change with the aging effect of the transmission paths under operation, or when an optical channel of a newly provided transmission path is determined. Alternatively, in the case where the transmission characteristics of any of the optical channels under operation are lower than a predetermined threshold value or recorded transmission characteristics of the optical channel not under operation, the test operation can be also executed.

The present embodiment shows the construction in which the optical channels whose number is larger than that of the actual input data signals by one are prepared and the optical channel having the worst transmission characteristics is not used. More optical channels may also be prepared. Such a construction that the optical channels which do not satisfy the predetermined transmission standard value are not used uniformly can be also used.

Further, the following construction can be also used. The oscillation frequencies of the optical transmitters TX1, TX2, TX3, . . . , and TX(m+1) can be varied by controlling a temperature through the control unit 307. The optimum oscillation frequency of each optical transmitter is detected by transmitting the test signal Dx while the oscillation frequency is varied. Consequently, the optimum optical transmitters in such a state are selected. When such a construction is used, it is a matter of course that the setting of the frequency to be de-multiplexed by the de-multiplexing filter 303 and, as necessary, the characteristics of the optical receivers RX1, RX2, . . . , and RX(m+1) are changed in correspondence to the change in oscillation frequencies of the optical transmitters TX1, TX2, TX3, . . . , and TX(m+1). Similarly, the transmission characteristics can also be measured while the optical powers of the output signals of the optical transmitters TX1, TX2, TX3, . . . , and TX(m+1) are controlled.

According to the above-mentioned third embodiment, when the wavelength division multiplexing transmission is performed by using the optical fiber transmission path, in order to avoid the interference due to the four wave mixing or cross phase modulation, the test signals Dx are transmitted over the wavelengths whose number are larger than that of the optical channels actually used, only the wavelengths satisfying the standard are selected from among them and used. The construction can be flexibly changed in accordance with the condition of the optical fiber and can effectively cope with a change in optical fiber with the aging effect.

Fourth Embodiment

Figure 7:
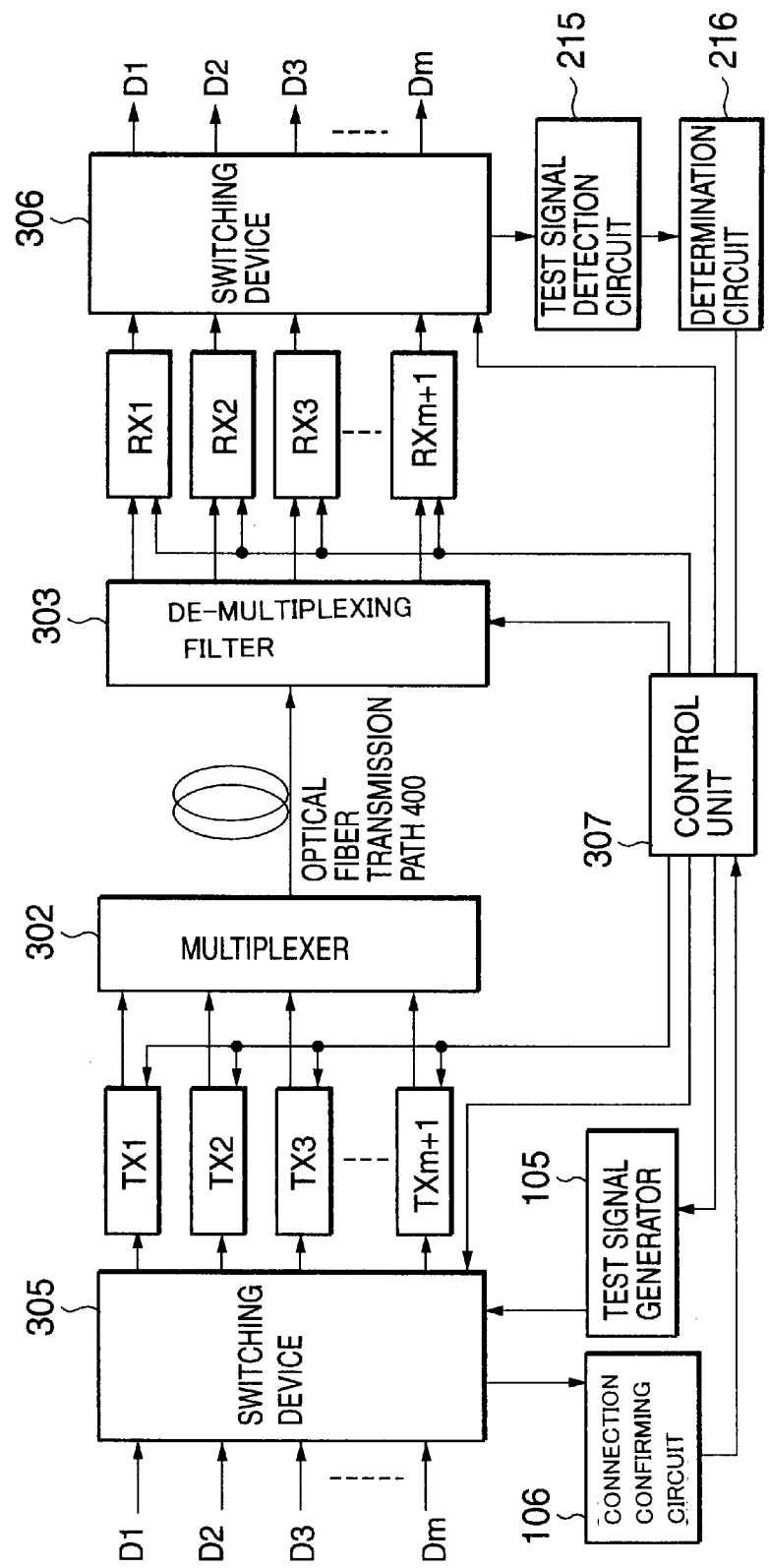
FIG. 7 is a block diagram showing a construction of a fourth embodiment.

A construction of a fourth embodiment as an optical transmission system for measuring the optical channel available quality by using the test signal Dx in a manner similar to the above-mentioned third embodiment will now be described with reference to FIG. 7. The construction of the fourth embodiment is different from that of the above third embodiment with respect to such a point that in the third embodiment, the coupler 308 branches the test signal Dx just after passing through the optical fiber transmission path 400 to measure the transmission characteristics of the optical channels and, on the other hand, in the fourth embodiment, the test signal Dx is outputted from one of the output terminals of the switching device 306 to measure the transmission characteristics of the optical channels. The other construction is the same as that of the third embodiment. Explanation regarding the details of the construction is omitted.

The measurement of the optical channel available quality and the determination of the optical channels in the above construction are performed in accordance with the following procedure in a manner similar to the third embodiment.

The optical transmission system executes the test operation before the start of the actual operation. First, the connection confirming circuit 106 which is connected to the switching device 305, confirms that the input data signals D1, D2, D3, . . . , and Dm are not supplied. After that, the test signals Dx generated by the test signal generator 105 are supplied to the optical transmitters TX1, TX2, TX3, . . . , and TX(m+1) via the switching device 305 and then transmitted as optical signals to the optical fiber transmission path 400. The transmitted optical signals are branched into respective optical channels through the de-multiplexing filter 303 and then converted into electric signals by the corresponding optical receivers RX1, RX2, . . . , and RX(m+1). The electric signals generated from the optical receivers RX1, RX2, . . . , and RX(m+1) are sequentially supplied to the test signal detection circuit 215 by the switching device 306. The transmission characteristics of the respective optical channels are measured by the timing decision circuit 216. The measurement result is transmitted to the control unit 307.

The control unit 307 records the measured transmission characteristics of the respective optical channels and determines on the basis of the recorded transmission characteristics whether each of the optical channels satisfies a setting value. On the determination result, the control unit 307 selects the m optical transmitters and optical channels to be used for the optical transmission on the transmitter side. The unit switches the connection in the switching device 305 so that the input data signals D1, D2, D3, . . . , and Dm are supplied to the selected optical transmitters. Similarly, on the receiver side, the unit switches the connection in the switching device 306 so that the outputs from the optical receivers corresponding to the selected optical channels become output data. Due to the above test operation, after completion of the measurement of the optical channel available quality and the setting of the optical channels, the input data signals are supplied to the optical transmission system to start the actual operation. The test operation is executed when a new transmission path is added to the operation paths to start the transmission, when they are periodically checked in correspondence to a change in transmission paths under operation with the aging effect, or when an optical channel for the new transmission path is determined. In the case of the construction of the fourth embodiment, since the test signals Dx passed through the optical channels can be individually detected after they are de-multiplexed by the de-multiplexing filter 303, it is possible to simultaneously supply the test signals Dx to the plurality of optical transmitters to be transmitted through the optical fiber transmission path 400 in the state of the WDM signal. With such a construction, it is possible to measure the transmission characteristics adapted to the case where the actual WDM signal is transmitted. Similar to the third embodiment, according to the fourth embodiment, there can also be provided a construction in which the optimum oscillation frequency or output signal optical power for each optical modulator is detected and the optimum optical modulators in such a state are selected.

Further, in the case of the construction according to the fourth embodiment, even during the operation other than a special test operation, the transmission characteristics of the optical channels can be measured and the optical transmitters and optical channels to be used for the optical transmission can be switched on the basis of such a measurement result.

The switching operation during the operation will now be described hereinbelow.

In the transmission system of the fourth embodiment, the m optical channels are used for the actual optical transmission during the operation in accordance with the result of the above-mentioned test operation and the optical channel having the worst transmission characteristics is in the unused state. The test signal Dx formed by the test signal generator 105 is supplied to the optical channel which is not used for the optical transmission (hereinbelow, referred to as an optical channel not under operation) through the switching device 305. Similar to the case of the test operation, the signal is supplied to the test signal detection circuit 215 via the switching device 306, so that the transmission characteristics are measured by the timing decision circuit 216. The measurement result of the transmission characteristics is transmitted to the control unit 307 and then recorded.

Further, as explained in the column in the foregoing background related art, for the optical channels under operation, the transmission characteristics can be measured by using actually transmitted optical signals, the transmission characteristics of the m optical channels under operation are measured by measuring means (not shown), and the measurement result of the transmission characteristics are also transmitted to the control unit 307 and then recorded.

The control unit 307 determines on the basis of the measured transmission characteristics of the optical channels whether each of the optical channels satisfies a setting value. Even when the transmission characteristics of any of the m optical channels under operation are degraded as compared with those of the optical channel not under operation, the connection in the switching devices 305 and 306 are changed to switch the optical channel under operation to one not under operation.

As mentioned above, there is such a probability that the m optical channels determined on the basis of, for example, the above test operation are not held as optimum optical channels due to a change with the aging effect after the start of the system operation. Even during the operation of the optical transmission system, however, the transmission characteristics of the optical channels including one not under operation are measured and the optical channel under operation, whose transmission characteristics are degraded, is switched to one not under operation, so that it is possible to rapidly cope with the deterioration.

As a test signal Dx, similar to the above-mentioned first embodiment, a low-speed repeat signal or intermittent signal of every predetermined period can be used. Thus, even in the case of a signal having a power that is lower than that of the normal input data signal, it can be detected by the test signal detection circuit 215. The occurrence of the non-linear fiber effect due to such a fact that the test signal Dx and the normal WDM signal are multiplexed and then transmitted can be minimized.

Further, for the optical channel not under operation, the transmission characteristics of the optical channel not under operation can also be improved during the operation of the optical transmission system by transmitting the test signal Dx while the oscillation frequency of the optical transmitter is changed.

When the improved transmission characteristics exceed those of any of the optical channels under operation, the optical channel is switched to one not under operation, so that the signal wavelength band to be used for the optical channels can be adjusted in order to combine the optimum optical channels for the whole optical transmission system even during the operation of the optical transmission system.

Alternatively, even when it is the optical channel under operation, the input data signal may not exist. In such a case, as mentioned above, the transmission characteristics of the optical channel cannot be measured by using the input data signal. However, in the case of the construction according to the fourth embodiment, the connection confirming circuit 106 can confirm whether the input data signal is supplied. When it is determined that no input data signal exists, in a manner similar to the first and second embodiments, the test signal Dx is supplied to the optical channel under operation in question by the switching device 305, so that the transmission characteristics can be measured.

The transmission characteristics of the optical channel not under operation or optical channel to which the input data signal is not supplied can be always measured or periodically measured at arbitrarily set intervals. Alternatively, when the transmission characteristics of any of the optical channels under operation are lowered than a predetermined threshold value or those of the optical channel not under operation, the measurement can also be performed.

Similar to the third embodiment, a plurality of spare optical channels can be prepared and the construction in which the optical channels which satisfy the predetermined transmission standard value are not used uniformly can be also used.

Figure 8:
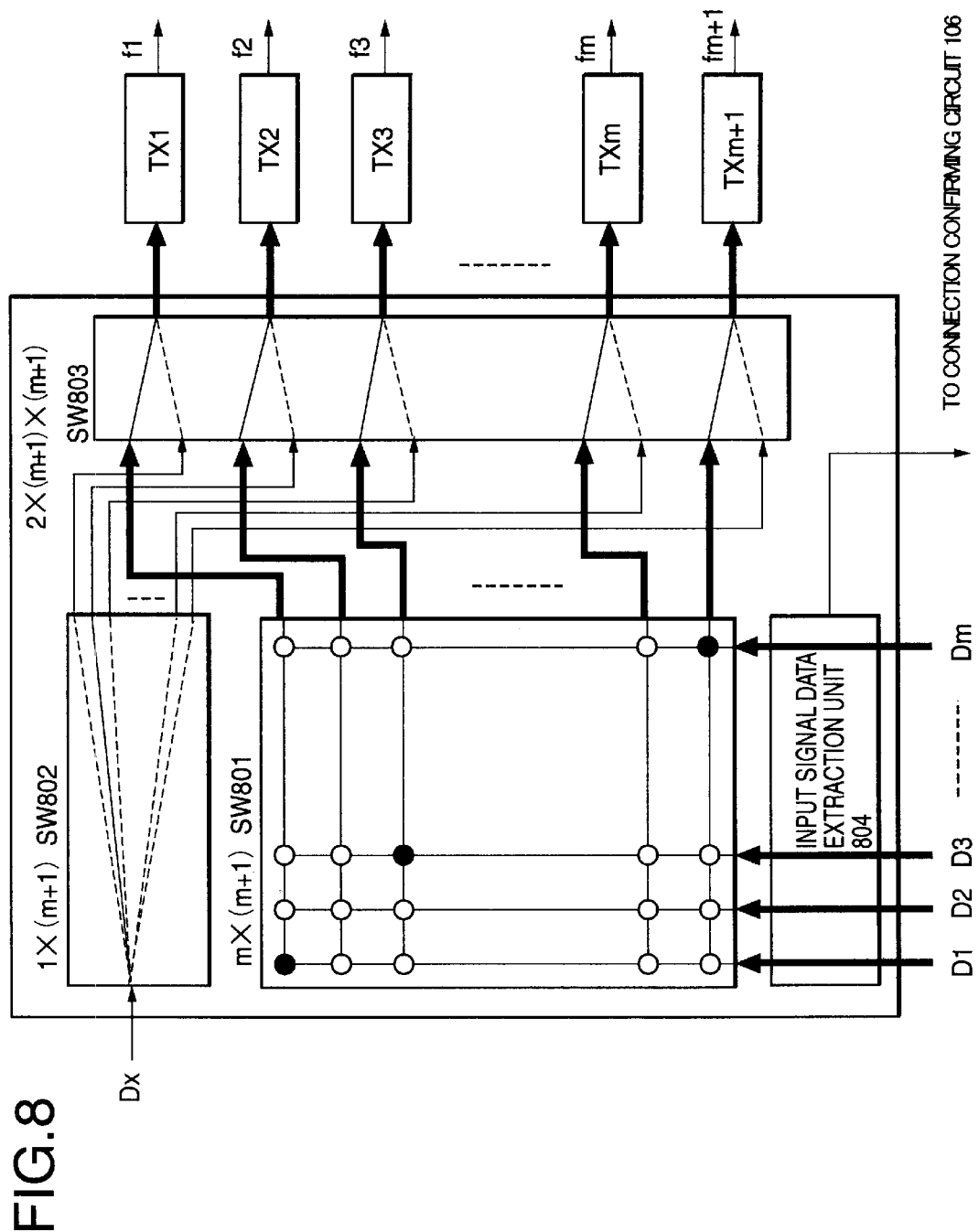
FIG. 8 is a diagram showing a construction of a first specific example of a switching device 305.

The specific construction of the switching device 305, which is important from the viewpoint of the realization of the third embodiment or fourth embodiment, will now be described. FIG. 8 shows a first specific example of the switching device 305. The switching device comprises an m×(m+1) switch 801, a 1×(m+1) switch 802, a 2(m+1)×(m+1) switch 803, and an input data signal extraction unit 804.

The input data signals D1 to Dm are connected to m input terminals of the m×(m+1) switch 801 through the input data signal extraction unit 804, respectively. In a manner similar to the optical signal transmitter unit 100 shown in FIG. 1, a part of the input data signals D1 to Dm are branched in the input data signal extraction unit 804 and then supplied to the connection confirming circuit 106 shown in FIG. 6 or 7. The m×(m+1) switch 801 is a cross/bar type switch having the m input terminals and (m+1) output terminals, in which an arbitrary input terminal can be connected to an arbitrary output terminal on the basis of a control signal. The (m+1) output terminals of the m×(m+1) switch 801 are connected to input terminals of the 2(m+1)×(m+1) switch 803.

On the other hand, the test signal Dx is supplied to one input terminal of the 1×(m+1) switch 802. The 1×(m+1) switch 802 can connect the input terminal to an arbitrary output terminal among the (m+1) output terminals. The (m+1) output terminals are also connected to the 2(m+1)×(m+1) switch 803.

The 2(m+1)×(m+1) switch 803 is a blocking type switch in which all ports are simultaneously switched in a lump. The switch 803 supplies either one of the input data signal from the m×(m+1) switch 801 and the test signal from the 1×(m+1) switch 802 to the optical transmitters TX1 to TX(m+1) on the basis of the control signal.

With such a construction, the connecting relation of the input/output terminals of the switching device 305 can be arbitrarily changed due to the control of the control unit 307, so that the input data signals D1, D2, D3, . . . , and Dm and test signal can be supplied to the arbitrary optical transmitters TX1, TX2, TX3, . . . , and TX(m+1).

Figure 9:
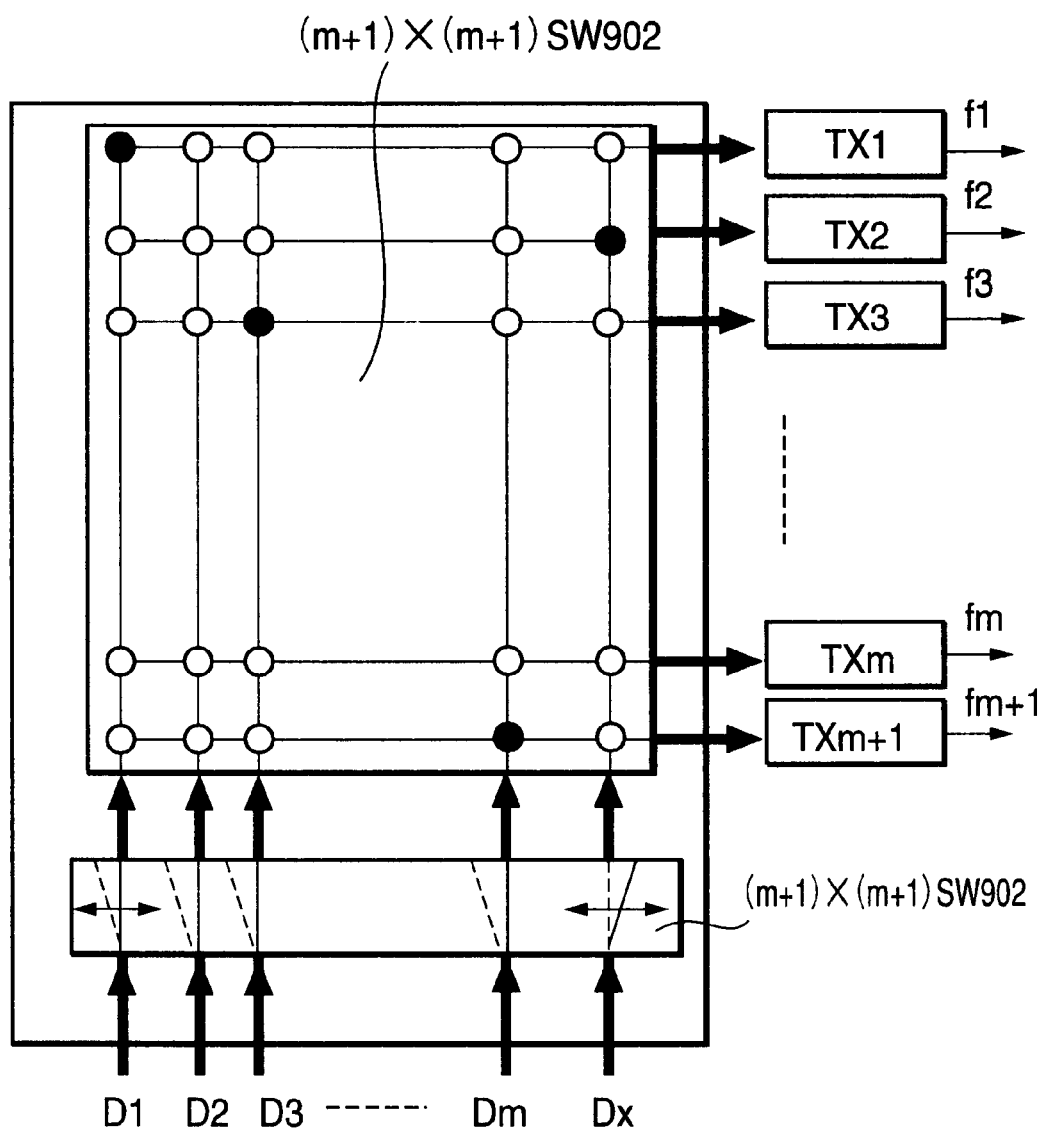
FIG. 9 is a diagram showing a construction of a second specific example of the switching device 305.
Figure 10:
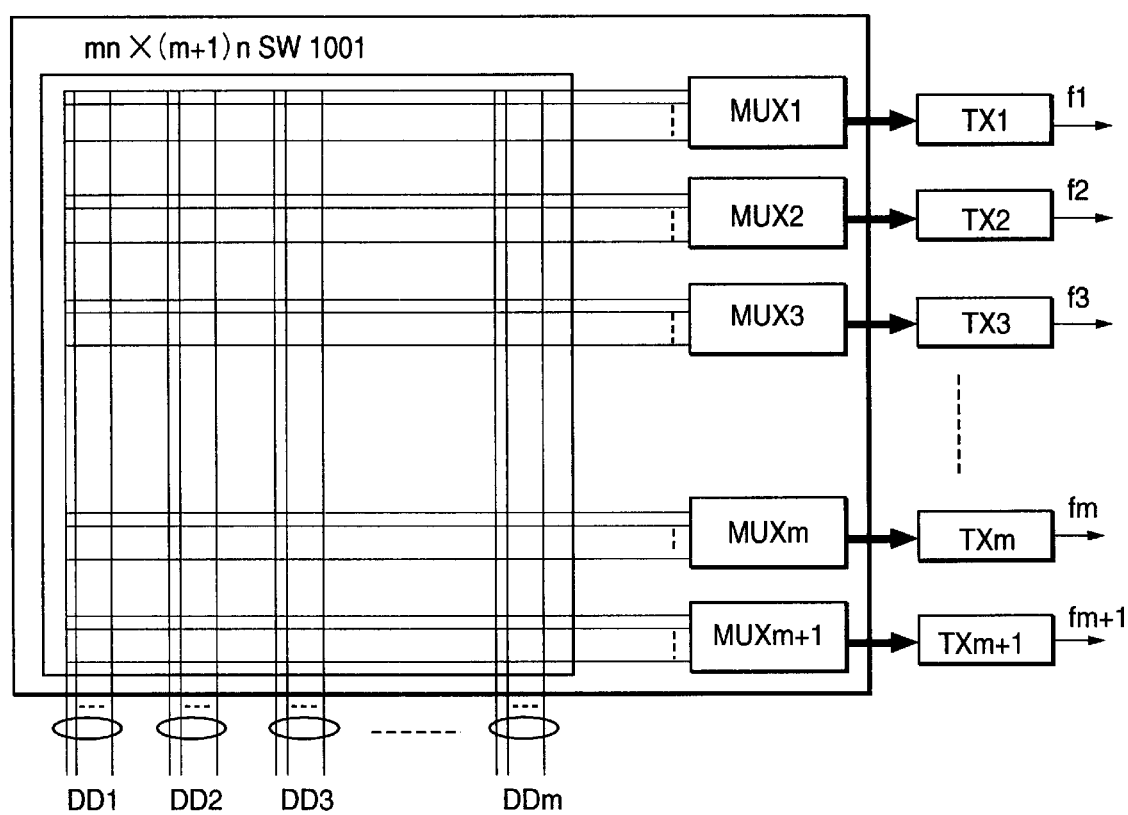
FIG. 10 is a diagram showing a construction of the switching device 305 in the case where input data signals each consisting of n low-speed data signals are multiplexed to be converted into high-speed data signals, and then transmitted.

Further, FIG. 9 shows a second specific embodiment of the switching device 305. The device 305 comprises a first (m+1)×(m+1) switch 901 and a second (m+1)×(m+1) switch 902. Though omitted in the diagram, the input data signal extraction unit for branching a part of the input data signals D1 to Dm to extract it is also provided for the switching device 305 in FIG. 9.

The first (m+1)×(m+1) switch 901 is a blocking type optical switch in which all ports are simultaneously switched in a lump. The input data signals D1 to Dm and the test signal Dx are selectively generated out of the switch on the basis of the control signal.

The second (m+1)×(m+1) switch 902 is a cross/bar type optical switch for supplying the input data signals D1 to Dm or test signal Dx to the arbitrary optical transmitters TX1, TX2, TX3, . . . , and TX(m+1) on the basis of the control signal.

With such a construction, the connecting relation of the input/output terminals can be arbitrarily changed in the construction that is simpler than that of the above first specific example, so that the input data signals D1, D2, D3, . . . , and Dm and test signal can be supplied to the arbitrary optical transmitters TX1, TX2, TX3, . . . , and TX(m+1).

When the above-mentioned first and second specific examples are used, it is possible to realize the switching device 305 corresponding to the test operation of the third embodiment or fourth embodiment. Further, for the construction to realize the measurement of the transmission characteristics of the optical channels under operation disclosed in the explanation of the fourth embodiment, the 2(m+1)×(m+1) switch 803 in the first specific example or first (m+1)×(m+1) switch 901 in the second specific example comprises an optical switch array in which switching of the ports can be independently controlled at every channel, so that it can be easily realized.

Further, the construction according to the third embodiment or fourth embodiment can be also applied to a construction in which each of input data signals each consisting of n low-speed data signals is multiplexed to be converted into a high-speed data signal and thus processed signal is transmitted. In this case, it can easily cope with the application in such a manner that, for example, for the construction of the switching device 305, the m×(m+1) switch 801 is changed so as to have a construction comprising a cross/bar type mn×(m+1)n switch 1001 which can generate low-speed data signals DD1 to DDm supplied to arbitrary input terminals out of arbitrary output terminals, and multiplexers MUX1 to MUX(m+1) which are connected to the output terminals of the mn×(m+1)n switch 1001 and each of which multiplexes a low-speed data signal to be converted into a high-speed data signal.

As mentioned above, according to the third or fourth embodiment, in the transmission path constructing the wavelength division multiplexing communication system, since the transmission quality is evaluated in the actual state where the signals are transmitted and the optimum wavelength can be set, the communication path with a good quality can be assured by using the limited transmission path. Since the wavelength is not previously set but the wavelength can be properly selected, the multiplicity of the multiplex wavelength can be raised while the quality of the transmission path is maintained.

Further, every embodiment relates to the optical transmission system in which the transmitting direction of the input data signal is the single-direction but it can be also applied to a bi-directional optical transmission system.

As mentioned above, according to the present invention, the test signal generating circuit is provided on the optical transmitting circuit side and the timing decision circuit is added on the receiver side, so that the available state of the optical transmission system can be easily detected. Consequently, a system maintenance person needs not to often perform the connection test in order to maintain the communication quality, and the availability can be automatically measured and determined. Thus, even during the system operation, the test operation is performed, so that it is possible to selectively switch the wavelength (optical channel) having a good quality and use it. Further, the maintenance of the system can be efficiently performed.

What is claimed is:

1. An optical transmission system comprising:
    a switching device having m input terminals each of which an input data signal is supplied to, an input terminal to which a test signal is supplied, and n (n is an integer larger than m) output terminals, for being able to generate a plurality of signals supplied to the m input terminals for the input data signals and the input terminal for the test signal to any of said n output terminals on the basis of a control signal;
    optical transmitters connected to the n output terminals of said switching device, respectively, for converting the signals supplied from the switching device into n optical signals having different wavelengths corresponding to n optical channels to generate them;
    a multiplexer for wavelength-multiplexing the plurality of optical signals generated from said n optical transmitters;
    an optical fiber transmission path for transmitting said wavelength-multiplexed optical signal;
    a transmission path characteristics determination circuit for receiving the wavelength-multiplexed optical signal from said optical fiber transmission path to determine transmission characteristics of said n optical channels; and
    a control unit for selecting optical channels to be operated and an optical channel not to be operated from among said n optical channels on the basis of the determination result of said transmission path characteristics determination circuit and controlling said switching device through the control signal so that said input data signals are supplied to said optical transmitters corresponding to said optical channels to be operated on the basis of the selection result.

2. The system according to claim 1, wherein a connection confirming circuit for confirming the presence or absence of the input data signal is connected to each of the input terminals for the input data signals of said switching device and, when said connection confirming circuit confirms that no input data signal to a specific input terminal exists, said control unit controls the switching device so that said test signal is supplied to said optical transmitter to which such an input terminal for the input data signal is connected.

3. The system according to claim 1, wherein said n denotes (m+1), the optical channel having the worst transmission characteristics is set to an optical channel not to be operated, and the remaining n optical channels are selected as optical channels to be operated.

4. The system according to claim 1, wherein said control unit records the transmission characteristics of said optical channel not to be operated and, when the transmission characteristics of any of said optical channels under operation are degraded as compared with those of the optical channel not to be operated, the control unit switches said optical channel under operation, which has the degraded transmission characteristics, to the optical channel not to be operated.

5. The system according to claim 1, wherein said control unit controls said switching device through said control signal so that said test signal is supplied to said optical channel not to be operated.

6. The system according to claim 5, wherein said test signal is transmitted at a power that is lower than that of said input data signal.

7. The system according to claim 5, wherein said test signal is a continuous wave optical signal to be generated from said optical transmitter.

8. The system according to claim 5, wherein said n optical transmitters can vary output wavelengths and the optical transmitter to which said test signal is supplied varies an output wavelength in accordance with an instruction of said control unit.

9. An optical channel available quality measuring method, wherein on a transmitter side comprising:

a switching device having m input terminals each of which an input data signal is supplied to, an input terminal to which a test signal is supplied, and n (n is an integer larger than m) output terminals, for being able to generate a plurality of signals supplied to those m input terminals for the input data signals and the input terminal for the test signal to any of said n output terminals on the basis of a control signal;

n optical transmitters connected to the n output terminals of said switching device, respectively, for converting the signals supplied from the switching device into n optical signals having different wavelengths corresponding to n optical channels to generate them; and a multiplexer for wavelength-multiplexing a plurality of optical signals generated from said n optical transmitters, the test signals formed by a test signal generator are converted into the optical signals by said n optical transmitters and then transmitted to an optical fiber transmission path, on a receiver side, the test signals corresponding to said optical channels are detected from the transmitted optical signals, transmission characteristics of the n optical channels are determined by using the detected test signals, optical channels to be operated and an optical channel not to be operated are selected from the n optical channels on the basis of the determination result, said switching device is controlled through said control signal on the basis of the selection result so that said input data signals are supplied to said optical transmitters corresponding to said optical channels to be operated, and after that, the operation using the input data signals is started.

10. The method according to claim 9, wherein said n denotes (m+1), the optical channel having the worst transmission characteristics is set to an inoperative optical channel not to be operated, and the remaining n optical channels are selected as optical channels to be operated.

11. The method according to claim 9, wherein said n optical transmitters can vary output wavelengths and the optical transmitters to which said test signals are supplied determine the transmission characteristics while varying the output wavelength in accordance with an instruction of a control unit.

* * * * *